United States Patent
Schewerda

(10) Patent No.: US 9,718,321 B2
(45) Date of Patent: Aug. 1, 2017

(54) SUSPENSION UNIT

(71) Applicant: SAF-HOLLAND GmbH, Bessenbach (DE)

(72) Inventor: Steffen Schewerda, West Olive, MI (US)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/651,094

(22) PCT Filed: Jun. 2, 2014

(86) PCT No.: PCT/EP2014/061303
§ 371 (c)(1),
(2) Date: Jun. 10, 2015

(87) PCT Pub. No.: WO2014/191570
PCT Pub. Date: Dec. 4, 2014

(65) Prior Publication Data
US 2016/0221603 A1    Aug. 4, 2016

(30) Foreign Application Priority Data
May 31, 2013 (DE) .................. 10 2013 210 142

(51) Int. Cl.
*B60G 9/02* (2006.01)
*B60G 7/00* (2006.01)
(Continued)

(52) U.S. Cl.
CPC ............... *B60G 9/02* (2013.01); *B60G 7/001* (2013.01); *B60G 9/003* (2013.01); *B60G 11/28* (2013.01);
(Continued)

(58) Field of Classification Search
CPC .. B60G 9/02; B60G 2200/30; B60G 2204/40; B60G 2204/126; B60G 2206/70; B60G 2204/61
(Continued)

(56) References Cited

U.S. PATENT DOCUMENTS 3,801,086 A    4/1974    Raidel
4,309,045 A    1/1982    Raidel
(Continued)

FOREIGN PATENT DOCUMENTS

CA    976578    10/1975
DE    10231376    7/2002
(Continued)

OTHER PUBLICATIONS

Sauer Achsenfab DE 29824897 English Machine Translation.*

*Primary Examiner* — Karen Beck
(74) *Attorney, Agent, or Firm* — Price Heneveld LLP

(57) ABSTRACT

The invention relates to a suspension unit, in particular for commercial vehicles, including an arm and a support element. The support element includes a support region and a support-side engagement region and comprises as a single piece, and the arm has an arm-side engagement region. A first engaging structure is provided on the arm-side engagement region, the engaging structure being attachable to a second engaging structure located on the support-side engagement region, and the support region includes a securing portion that fixes an air spring bellows and a rolling surface.

22 Claims, 6 Drawing Sheets

(51) Int. Cl.
  *B60G 9/00*   (2006.01)
  *B60G 11/28*  (2006.01)
  *B62D 7/16*   (2006.01)
  *B62D 15/00*  (2006.01)

(52) U.S. Cl.
  CPC ............. *B62D 7/163* (2013.01); *B62D 15/00* (2013.01); *B60G 2200/30* (2013.01); *B60G 2200/464* (2013.01); *B60G 2202/152* (2013.01); *B60G 2204/126* (2013.01); *B60G 2204/40* (2013.01); *B60G 2204/44* (2013.01); *B60G 2204/61* (2013.01); *B60G 2206/11* (2013.01); *B60G 2206/70* (2013.01); *B60G 2206/7101* (2013.01); *B60G 2206/8207* (2013.01)

(58) Field of Classification Search
  USPC .................................................... 280/93.507
  See application file for complete search history.

(56) References Cited

U.S. PATENT DOCUMENTS

| | | |
|---|---|---|
| 7,954,833 B1 | 6/2011 | Heath et al. |
| 8,317,209 B2 | 11/2012 | Aalderink et al. |
| 2001/0020775 A1* | 9/2001 | Pierce .................... B60G 7/001 280/124.128 |
| 2002/0067016 A1* | 6/2002 | Ness ........................ B60G 7/02 280/124.108 |
| 2003/0164585 A1 | 9/2003 | Memmel et al. |
| 2004/0188972 A1* | 9/2004 | Abrat ...................... B60B 27/02 280/124.128 |
| 2006/0237940 A1 | 10/2006 | Raidel, II et al. |
| 2010/0109309 A1* | 5/2010 | Kootstra ................ B62D 21/04 280/786 |
| 2010/0116572 A1* | 5/2010 | Schmitt .................... B60G 3/28 180/65.51 |
| 2012/0315414 A1* | 12/2012 | Wesch ................... B60G 7/001 428/34.1 |
| 2014/0116192 A1* | 5/2014 | Hemmege Venkatappa .............. G05G 1/44 74/512 |
| 2016/0037764 A1* | 2/2016 | DePriest ............. A01M 7/0071 248/70 |
| 2016/0152104 A1* | 6/2016 | Spielmann ............ B60G 7/001 280/124.116 |

FOREIGN PATENT DOCUMENTS

| | | | |
|---|---|---|---|
| DE | 29824897 | 6/2003 | |
| DE | WO 2015014702 A1 * | 2/2015 | ............. B60G 7/001 |
| WO | 2012135200 | 10/2012 | |

* cited by examiner

SUSPENSION UNIT

BACKGROUND OF THE INVENTION

The present invention relates to a steering or suspension unit, in particular for use in commercial vehicles or utility vehicles.

Steering units are well known in the prior art. They serve for mounting vehicle wheels on the frame of the vehicle, in particular of the commercial vehicle, in a spring-loaded manner. To this end, the steering unit has a receiving portion for an air spring as well as a region for pivotably mounting on the vehicle frame. Furthermore, there is usually provided a region for receiving the axle or the axle stub. Up to now, such steering units have preferably been produced as single-piece castings or forgings, wherein, for each type of commercial vehicle, a separate steering unit has to be developed and provided, which corresponds to the building space conditions in the chassis area and which allows for taking up the necessary loads. The steering units known in the prior art can therefore be used for one type of vehicle only and the development work is accordingly great. There is a need for improvement to make it possible to use a steering unit in different types of vehicles and to simultaneously reduce the weight of the steering unit by an intelligent distribution of functions.

The object underlying the present invention is to provide a steering unit, which can be used for manifold purposes and which, at the same time, has a lower weight than the steering units known in the prior art.

SUMMARY OF THE INVENTION

According to the invention, the steering unit comprises an arm and a support element, wherein the support element has a support region and a support-side engagement region and is designed as a single piece, wherein the arm has an arm-side engagement region, wherein a first engaging means is provided on the arm-side engagement region, said engaging means being attachable to or engageable into a second engaging means provided on the support-side engagement region, wherein the support region has a securing portion for fixing an air spring bellows or air bellows and a rolling surface. The arm of the steering unit is preferably the longish part of a trailing arm of a chassis, which essentially extends in the longitudinal direction of the vehicle. Usually, the arm is secured at the first distal end thereof on the frame of the vehicle against translational movements relative to the vehicle and mounted pivotably about an axis oriented transverse to the longitudinal direction of the vehicle. The arm has an arm-side engagement region at its distal end opposite the first end. In addition, the steering unit comprises a support element formed as a component separate from the arm, which, thus, can be mounted and dismounted separately. The support element has a support region preferably taking over the functions of the plunger piston of an air spring, which, to this end, has a securing portion and a rolling surface. The securing portion serves in particular for fixing the air bellows, particularly preferably by clamping, such as by means of a clamping plate fixed at the securing portion of the support region. The rolling surface of the support region is preferably a lateral surface or outer surface of the support region, which has both anticlastic curves and synclastic curves. The rolling surface of the support region, similar to a rolling surface of a plunger piston, serves for supporting the air bellows during the operation of the steering unit, wherein preferably all regions coming into contact with the air spring have rounded geometries. Thus, damage to the air bellows due to sharp-edged geometries at the support region can be avoided. The support element according to the invention thus combines the functions of a plunger piston for the use of an air spring with that part of the function of a conventional trailing arm, which arranges the plunger piston and, thus, the entire air spring in a predetermined distance to the first distal end thereof, at which it is pivotably mounted. The support element is formed single-piece, wherein single-piece in this context, apart from a homogenous design from solid matter such as steel or aluminum, means also an even compound of composite materials, preferably carbon or glass fibers in combination with a resin or matrix material and inlaid or embedded metal elements for locally increasing strength. The single-piece element is characterized by a permanent connection or interlocking of the material components, which has already been produced during the manufacturing process and which can only be dissolved by destroying the material or structures. In particular the support region is designed single-piece with the support-side securing region.

Preferably, the rolling surface is essentially rotation-symmetric about a spring axis, wherein the maximum extension of the rolling surface transverse to the spring axis is the radius of an imaginary cylinder, wherein the support-side engagement region on the support element is arranged preferably outside the imaginary cylinder. Essentially rotation-symmetric means in this context that smaller deviations from the mathematically perfect rotational symmetry about the spring axis at the rolling surface are indeed admissible without impairing the function of the steering unit according to the invention. The maximum extension of the rolling surface transverse or preferably perpendicular to the spring axis defines the radius of an imaginary cylinder extending concentrically about the spring axis and, thus, entirely enclosing the rolling surface. Preferably, the support-side engagement region is arranged on the support element outside the imaginary cylinder. To put it differently, laterally at the support region of the support element, wherein the support-side engagement region has a radial extension in relation to the imaginary cylinder. Preferably, the spring axis is parallel to or in the direction, along which the support region deflects into the air bellows. As a matter of course, due to the fact that the support element moves along a circular path on the pivotably mounted steering unit, the exact correspondence between the spring axis and the direction of deflection into the air bellows of the air spring is present only in a certain pivot position of the steering unit relative to the chassis of the utility vehicle. Preferably, said pivot position is the position of the steering unit relative to the chassis, where there is the desired height of travel. In this context, for the height of travel the definition known from the prior art is used, according to which the rotatable support of the wheels of the vehicle is arranged on the vehicle frame at a certain vertical distance to a reference height.

Preferably, the support-side engagement region has a maximum extension transverse to the spring axis, wherein the relationship of the radius of the imaginary cylinder to the extension of the support-side engagement region is in a range of 0.1 to 0.95, preferably 0.3 to 0.8, and most preferably about 0.4 to 0.6. To put it differently, the maximum extension of the support-side engagement region transverse or preferably perpendicular to the spring axis is a measure of the distance between the support-side engagement region and the support region. The larger the extension of the support-side attachment region transverse to the spring axis, the larger is also the lever arm, acting on the support-side engagement region by means of the air spring via the support region of the support element. On the other hand, a large distance between the support-side engagement region and the rolling surface of the support element provides sufficient building space, in which the air spring may expand in its maximally deflected state. Choosing a preferable relationship of the radius to the extension in a range of 0.1 to 0.95 makes it particularly preferably possible to optimally use the building space on the steering unit and at the same time to prevent that the air spring in the maximum deflected state comes into contact with possibly sharp-edged geometries in the area of the support-side engagement region. In particular when there is a rolling surface with a large maximum extension transverse to the spring axis, which leads to a large radius of the imaginary cylinder, it has to be assumed that also the air spring fixed at the support region of the support element has larger space requirements in the deflected state, wherein accordingly the support region of the support element is preferably arranged at a larger distance from the spring axis in order to avoid collisions between the support region and the air bellows.

Particularly preferably, selected edges of the support-side engagement region are rounded, wherein the radius of rounding is in a range of 1 mm to 30 mm, preferably 5 mm to 20 mm, and most preferably about 10 mm to 14 mm. In this context, selected edges are preferably those edges or portions of edges, which, during the operation of the steering unit, may come into contact with an air bellows fixed at the support region. In particular the edges on the upper side or the side of the support-side engagement region, to which also the support portion extends, are preferably provided with roundings. The rounded edges ensure that the air bellows, in the strongly deflected state and when it possibly rests against the support-side engagement region, suffers damage due to cuts and notching. The radius of rounding is preferably chosen in a range of 1 mm to 30 mm so as not to too much weaken the strength of the support-side engagement region and at the same time to reduce the sharp-edgedness at the support-side engagement region. Here, a smaller radius of rounding of 1 mm to 8 mm may be sufficient when the air bellows is made from a relatively stable material, and such a heavy rounding with a radius of rounding of more than 14 mm is not required. On the other hand, it may be preferred to form a rounding with a radius of rounding of 15 mm to 30 mm, when it is expected that there is more frequently a contact between the possibly sensitive air bellows and the support-side engagement region is expected and a weakening of the support-side engagement region is therefore accepted.

Particularly preferably, the first engaging means is formed as a projection or recess, wherein the second engaging means has a geometry corresponding to the first engaging means and can be brought into form-fitting engagement with the first engaging means. The first engaging means provided on the arm-side engagement region may preferably be a projection, such as a nose or hook-shaped geometry or a geometry projecting in any other way from the arm-side engagement region. Preferably, in this case the second engaging means provided on the support element is formed such that it may be brought into form-fitting engagement with the first engaging means or such that it engages into the first engaging means in a form-fitting manner. Preferably, also the engaging means formed as a recess may have an undercut, wherein the respective other engaging means formed as a projection may be inserted into the engaging means formed as a recess along a certain displacement direction and then by means of a further engaging means, for example, it may be secured in a position, in which the undercut of the engaging means formed as a recess prevents a displacement of the engaging means relative to each other and, thus, of the support element relative to the arm. In this context, corresponding geometry is defined that, when the one engaging means is formed as a recess, the respective other engaging means is either a projection formed such that it corresponds to the geometry of the recess or a further recess, wherein in this case a fixing means is provided, which engages both engaging means formed as a recess and thus secures them against displacement relative to each other. Preferably, a fixing element is provided, which may be brought into form-fitting engagement both with the first engaging means and with the second engaging means. The fixing element may be a screw/bolt, for example, which is in engagement with the first and second engaging means, wherein both engaging means are accordingly formed as a recess or bore, respectively. Alternatively preferably, the fixing element may also be a body having itself recesses, which may be brought into form-fitting engagement with the first or second engaging means formed as projections.

Particularly preferably, a plurality of first and second engaging means are provided, wherein at least one first engaging means and one second engaging means are each formed as bores, wherein a fixing element may be made to engage into both engaging means. Preferably, a plurality of first and second engaging means are provided, which particularly preferably have a hook-shaped cross-section, for example, and which may be brought into engagement with a geometry of the respective opposite engaging means by displacing the support element relative to the arm, which geometry is provided such that it corresponds to the hook-shaped cross-section. In order to fix the support element in the position, in which the engaging means are in form-fitting engagement with each other, it is preferred that a fixing element is provided, which additionally comes into engagement with engaging means provided therefor, wherein the fixing element essentially serves to secure the support unit and the arm in a position relative to each other, in which the first and second engaging means come into a form-fit with each other. The fixing element can be a pin or bolt/screw or also be formed as a plate and is preferably fixed at the steering unit in a last mounting step.

In a preferred embodiment, the arm-side engagement region has a first abutment surface, against which a second abutment surface of the support-side engagement region may come to rest such that it is supported thereby. Preferably, in addition to the form-fitting engagement of the engaging means with each other a first abutment surface is provided on the arm-side engagement region, which is adapted to support a correspondingly formed abutment surface of the support-side engagement region. In particular due to the bending loads to be expected, which act on the intersection between the support element and the arm, it is preferred that preferably the compressive stress portion of said bending load is transmitted from one element to the other element by means of a simple abutment surface, wherein the design of the steering unit may thus be simplified.

In a further preferred embodiment, the arm has a first bearing portion, a support portion and a second bearing portion, wherein the support portion extends between the first and second bearing portions, wherein an arm axis runs through the first and second bearing portions, wherein the arm-side engagement region has a middle main extension direction, and wherein the middle main extension direction of the arm-side engagement region is pivoted or inclined relative to the arm axis by an angle α. The first bearing portion of the arm is preferably the pivot axis or the region, in which the arm and, thus, the entire steering unit is pivotably fixed on the bearing block of the vehicle frame. Preferably, the first bearing portion is formed as a cylinder-shaped sleeve extending transverse to the longitudinal direction of the vehicle. The second bearing portion is preferably the axis center or the region, in which the axle tube of the vehicle or the axle stub may be or is fixed on the arm of the steering unit. Particularly preferably, the arm axis extends through the geometric centers of the first and second bearing portions, wherein the support portion need not necessarily extend concentrically or along the arm axis, but may also have a curved course. Particularly preferably, the arm axis runs in the first bearing portion through the axis, about which the arm or the steering unit is pivotably mounted, and particularly preferably through the point on said pivot axis, which is arranged centrally in the first bearing portion. Equally preferably, the arm axis in the second bearing portion runs through the point, which lies preferably on the axis of rotation defined by the axle stub, and which also lies centrally in the second bearing portion on the axis of rotation. The arm-side engagement region has an extension running essentially along a middle main extension direction. It is particularly preferred that one or a plurality of first engaging means is/are arranged along said middle main extension direction or in a plane running parallel to the middle main extension direction of the arm-side engagement region. It is further preferred that the direction, along which the support element is displaced relative to the arm in order to bring the first engaging means in form-fitting engagement with the second engaging means, is also parallel to the middle main extension direction of the arm-side engagement region. Further preferably, also the first abutment surface may be arranged in the main extension direction or parallel to the main extension direction of the arm-side engagement region. By designing the middle main extension direction of the arm-side engagement region pivoted relative to the arm axis, it is possible to simultaneously adjust both the travel height and the overall length of the spring unit solely by selecting at which position of the arm-side engagement region the support-side engagement region is fixed.

Preferably, the angle α has values between 1° and 90°, particularly preferably between 15° and 75°, and most preferably between about 30° and 60°. For a preferred angle of α=90° the arm-side engagement region extends essentially perpendicular to an arm axis defined by the first and second bearing portions of the arm. Thus, by arranging the support-side engagement region at a certain position and, thus, at a certain height on the arm-side engagement region, it is possible to adjust the travel height of the vehicle, wherein at the same time the overall extension or the length of the steering unit in the longitudinal direction of the vehicle remains essentially unchanged. For a preferred angle of α=0° the arm-side engagement region extends along the arm axis and by arranging the support-side engagement region on the arm-side engagement region, it is possible to adjust the length of the steering unit and, thus, in particular the distance between the support region of the support element and the second bearing portion of the arm without substantially changing the travel height. An angle range of 30° to 60° is particularly preferred, since it has been shown that there is the greatest flexibility of the adjustment of both the length of the steering unit and of the travel height when the arm-side engagement region extends along a middle main extension direction, which is at an angle of 30° to 60° relative to the arm axis.

In a particularly preferred embodiment, the arm-side engagement region is arc-shaped, wherein particularly preferably a convex first abutment surface is provided on the arm-side engagement region. Due to the arc-shaped or curved design of the arm-side engagement region it is possible, by selecting a certain fixing position of the support-side engagement region on the arm-side engagement region, to adjust both the length of the steering unit and the travel height, and at the same time to arrange the support element in a certain angular position relative to the arm, wherein due to this angular position, in particular the deflection and rebound of the air bellows at the support portion and in particular the rolling thereof along the rolling surface is optimized. Particularly preferably, the curvature of the arm-side engagement region has a radius of curvature, which is the same as the distance between the pivot axis arranged in the first bearing portion of the arm and the first abutment surface of the arm. Thus, it is possible to change the travel height at different fixing positions of the support-side engagement region on the arm-side engagement region, and at the same time it is possible to maintain the support region of the support element relative to the horizontal with as little angular deviation as is possible. To put it differently, it is preferred that the spring axis of the support region of the support element is a tangent to the circular path followed by the angular or pivoting movement of the steering unit, when the desired travel height or the desired standard deflection state of the air bellows has been reached.

Further preferably, the first engaging means has an engagement direction, which is in a parallel surface to the first abutment surface, wherein preferably a plurality of first engaging means is provided on the arm-side engagement region along said parallel surface. The engagement direction is preferably the direction along which the support element can be inserted relative to the arm into a fixed position or taken out of a fixed position. In particular when there is provided a plurality of first engaging means, it is preferred that all of the engaging means have an engagement direction extending along a parallel surface to the first abutment surface of the arm-side engagement portion.

Particularly preferably, a larger number of first engaging means than second engaging means is provided, wherein the first engaging means are arranged on the arm-side engagement region at equal distances relative to each other. By providing a plurality of first engaging means on the arm-side engagement region, of which only selected first engaging means come into engagement with the support-side second engaging means, it is possible to fix the support element in various positions relative to the arm so as to adjust the steering unit to the respective use requirements of the chassis. In particular by selecting a certain securing position of the support element on the arm, it is possible to adjust the travel height and/or the length of the steering unit. It is furthermore also possible to provide further first engaging means, which are provided displaced laterally, i.e. preferably transverse to the main extension direction of the arm-side engagement region, wherein the second engaging means each can be brought into engagement with selected ones of said first engaging means only and, thus, a certain path or track can be set for the support element or the steering unit. Track offset in this context means an offset along the transverse direction of the vehicle.

Particularly preferably, the support element has a composite material, wherein preferably 0.2 to 1 times, particularly preferably 0.5 to 1 times, and most preferably 0.75 to 0.95 times of the support element is made from a composite material. In this context, composite material means in particular a fiber-reinforced material, wherein a fiber material having a particularly high tensile strength is surrounded by a matrix material, wherein the fibers of the fiber material are arranged in particular along the main force direction or such that they provide for an optimum force flow. Certain areas of the support element, such as the second engaging means, are preferably made from metal, since in said regions high forces have to be transmitted in a small space. Regions of a larger surface, such as the support region with the rolling surface may be made from laid or braided composite structures, for example. Using a composite material makes it possible to reduce in particular the weight while the strength remains the same.

Preferably, a carbon-fiber composite is used as composite material. Alternatively preferably, it would also be possible to use GLARE (glass-fiber reinforced aluminum), an aramid-fiber composite material or particularly preferably a glass-fiber composite material, which preferably can be acquired at lower costs than an aramid-fiber or carbon-fiber composite, for example.

In a particularly preferred embodiment, the support-side engagement region has a lattice structure. In this context, lattice means a single-piece web-like structure with local cavities, where the load-bearing material webs are oriented depending on the direction of force and moment to be expected and have respective material thicknesses, wherein, however, weight can be saved by providing local cavities in the support-side engagement region. When making the support element from a composite material, it is preferred that the fibers of the composite material run along the main extension direction of the webs, such that the force flow through the support-side engagement region can be designed particularly favorably and, although the web thicknesses and, thus, the weight, are as low as is possible, the high forces or bending moments to be expected can be transmitted by the support-side engagement region. The lattice structure preferred here differs from a lattice structure in the classical sense in that the webs of the support-side engagement region transmit also bending moments apart from tensile and compressive stresses.

Preferably, a clamping plate is provided for fixing an air bellows in a force-fitting manner in the securing portion of the support element. It is particularly preferred that the clamping plate is forced by a screw/bolt reaching through the support element against the respective margin, which serves for fixing the air bellows, wherein particularly preferably the respective screw/bolt can be reached and tightened from the underside of the support element, i.e. from outside the air bellows.

BRIEF DESCRIPTION OF THE DRAWINGS

Further advantages and features of the invention become apparent from the following description with reference to the appended Figures. As a matter of course, individual features and embodiments shown in the Figures can also be used in embodiments shown in other Figures, insofar as this is not explicitly excluded. The Figures show.

DETAILED DESCRIPTION OF THE PREFERRED EMBODIMENTS

Figure 1:
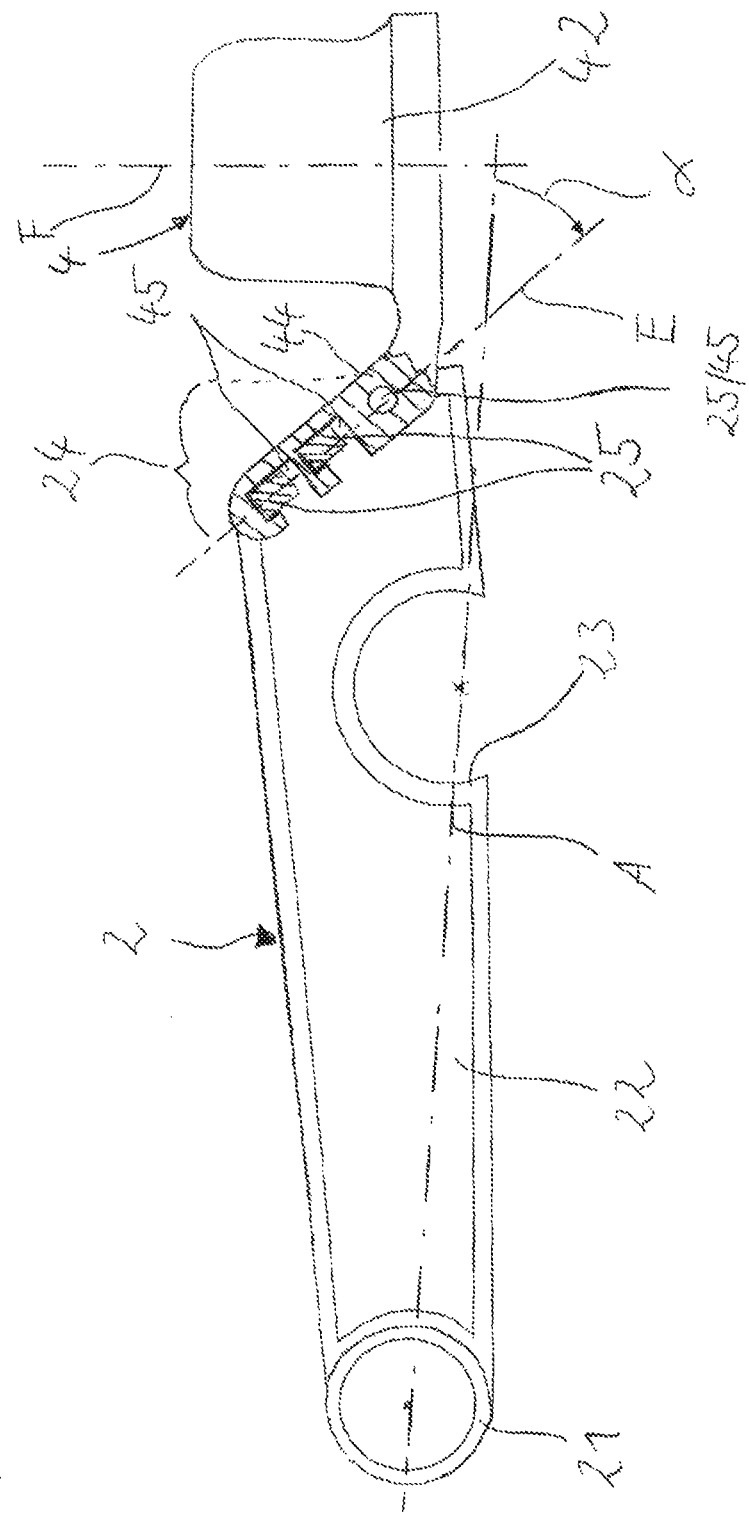
FIG. 1 shows a side view of a first preferred embodiment of the steering unit of the invention.

The side view of a preferred embodiment of the steering unit of the invention shown in FIG. 1 has an arm 2 and a support element 4, wherein the arm 2 has a first bearing portion 21, adjacent thereto a support portion 22, and a second bearing portion 23. At the end of the arm 2, opposite the first bearing bearing portion 21, there is provided an arm-side engagement region 24 extending essentially along a middle main extension direction E. At the arm-side engagement region 24, the support-side engagement region 44 of the support element 4 may be fixed in a form-fitting manner, which is shown partially sectioned in the Figure for better illustration. To this end, the arm-side engagement region 24 has first engaging means 25, and the support-side engagement region 44 has second engaging means 45. Preferably, the first engaging means 25 are designed differently. As is shown, the upper two first engaging means 25 are formed as projections having an essentially rectangular cross-section and protrude from the arm-side engagement region 24 in the direction of the viewer. The lower first engaging means 25 may preferably be a cylinder-shaped bore, corresponding to which there is provided on the support-side engagement region 44 a second engaging means 45 designed as a bore. FIG. 1 shows the position, in which the second engaging means 45 formed as hook-shaped cavities are arranged such that their respective inner contours form undercuts, each of which is in form-fitting engagement with one respective first engaging means 25. In said position, also the two lower first engaging means 25 and second engaging means 45, respectively, which are designed as bores, are arranged coaxially relative to each other, and it is possible to insert a fixing means (not shown), which secures the support element in particular against displacement along the middle main extension direction E. The direction, along which the first engaging means 25 can be made to engage into the second engaging means 45 in a form-fitting manner, runs preferably parallel to the middle main extension direction E of the arm-side engagement region 24. It should be noted here that the arm axis A and the middle main extension direction E of the arm-side engagement region 24 do not necessarily have to intersect, but may also be skew relative to each other. Preferably, the angle α drawn in FIG. 1 is defined between the respective geometric projections on a vertical plane, in which preferably the arm axis A is located, as is shown in FIG. 1. The preferred embodiment shown simplifies the mounting of the steering unit since the support element 4 can be hooked at first at the first engaging means 25 by means of the second engaging means 45 thereof, and subsequently a fixing element (not shown) can be made to engage into the engaging means 25, 45 designed as bores. The small number of steps required for mounting and the small number of components to be handled simultaneously advantageously allow for a quick and easy mounting or dismounting of the steering unit. The main extension direction E of the arm-side engagement region is preferably pivoted by an angle α relative to an arm axis A. Here, the arm axis A runs preferably through the centers of the first bearing portion 21 and the second bearing portion 23 of the arm 2. The support element 4 further comprises a support region 42, the shape of which is in particular similar to the plunger piston of an air spring.

Figure 2:
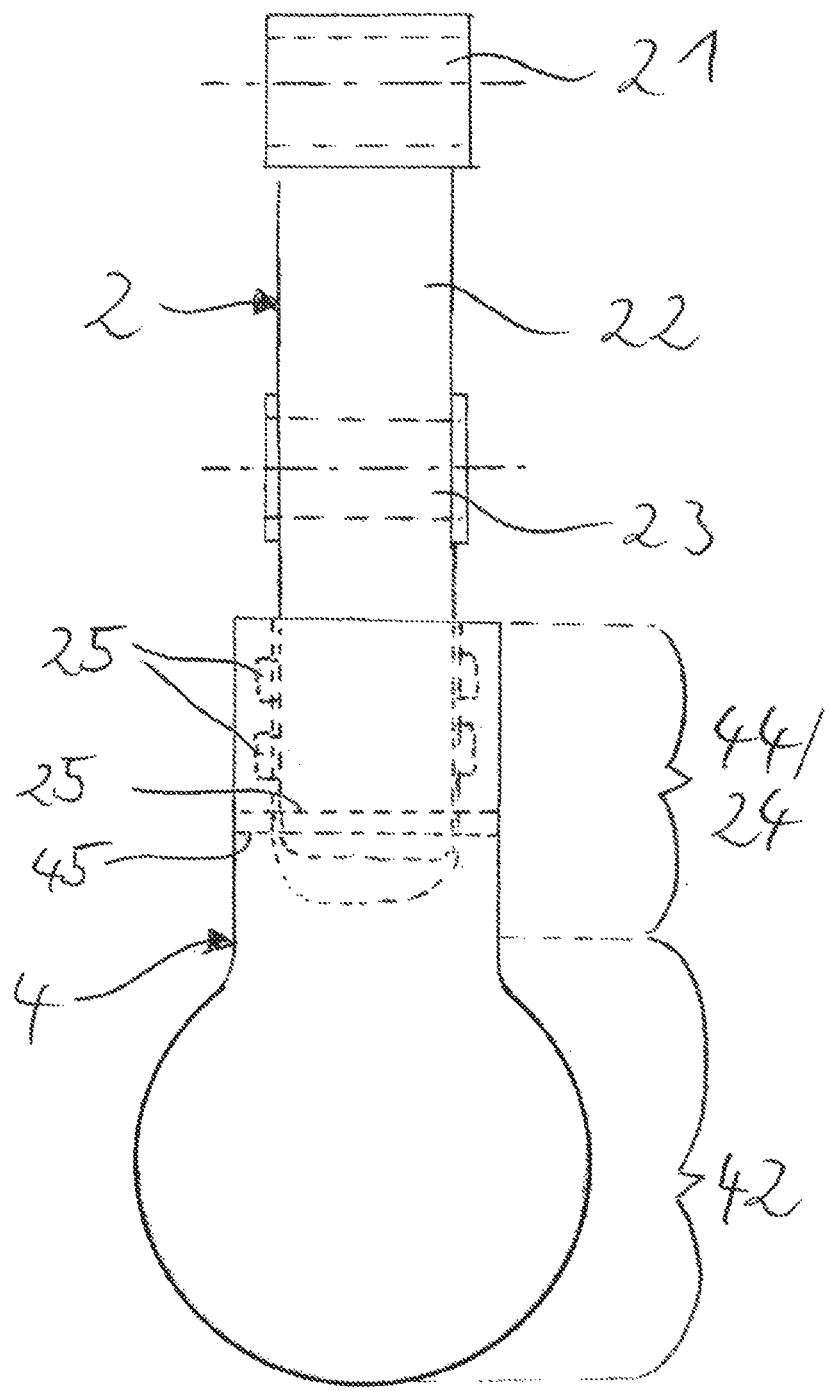
FIG. 2 shows a top plan view of the preferred embodiment shown in FIG. 1 of the steering unit of the invention.

FIG. 2 shows a top plan view of the preferred embodiment of the steering unit of the invention already shown in FIG. 1. Preferably, the support-side engagement region 44 has two similarly formed legs, wherein at each one of the legs preferably two second engaging means 45 are provided, which are each adapted to come into form-fitting engagement with a respective first engaging means 25 of the arm-side engagement region 24. The first engaging means 25 are preferably formed as projections protruding laterally from the arm-side securing region 24. The second engaging means 45 are preferably formed as corresponding recesses. Furthermore, the first engaging means 25 or the second engaging means 45, respectively, which engaging means are designed as bores and which extend transverse through the arm-side and the support-side securing regions and through which preferably a pin or a screw/bolt may be passed in order to secure the support element 4 against displacement relative to the arm 2. The support region 42 of the support element 4 is shown without further contours to make it clear that all outer geometries of the support region are rounded and formed with even surface curves. The support region 42 is formed single-piece with the engagement region 44. In this context, apart from a homogenous design made from a solid material such as steel or aluminum, single-piece also means an even compound of various materials such as carbon fibers, resin or matrix material and inlaid or embedded metal elements for locally increasing strength. The fact that the support region and the engagement region are made single-piece is characterized by a permanent connection or interlocking of the material components, which is produced when the support element is manufactured. In the Figure, there is further indicated the pivot axis, about which the steering unit can be or is fixed pivotably on the vehicle frame (not shown) in the first bearing portion 21 of the arm 1.

Figure 3:
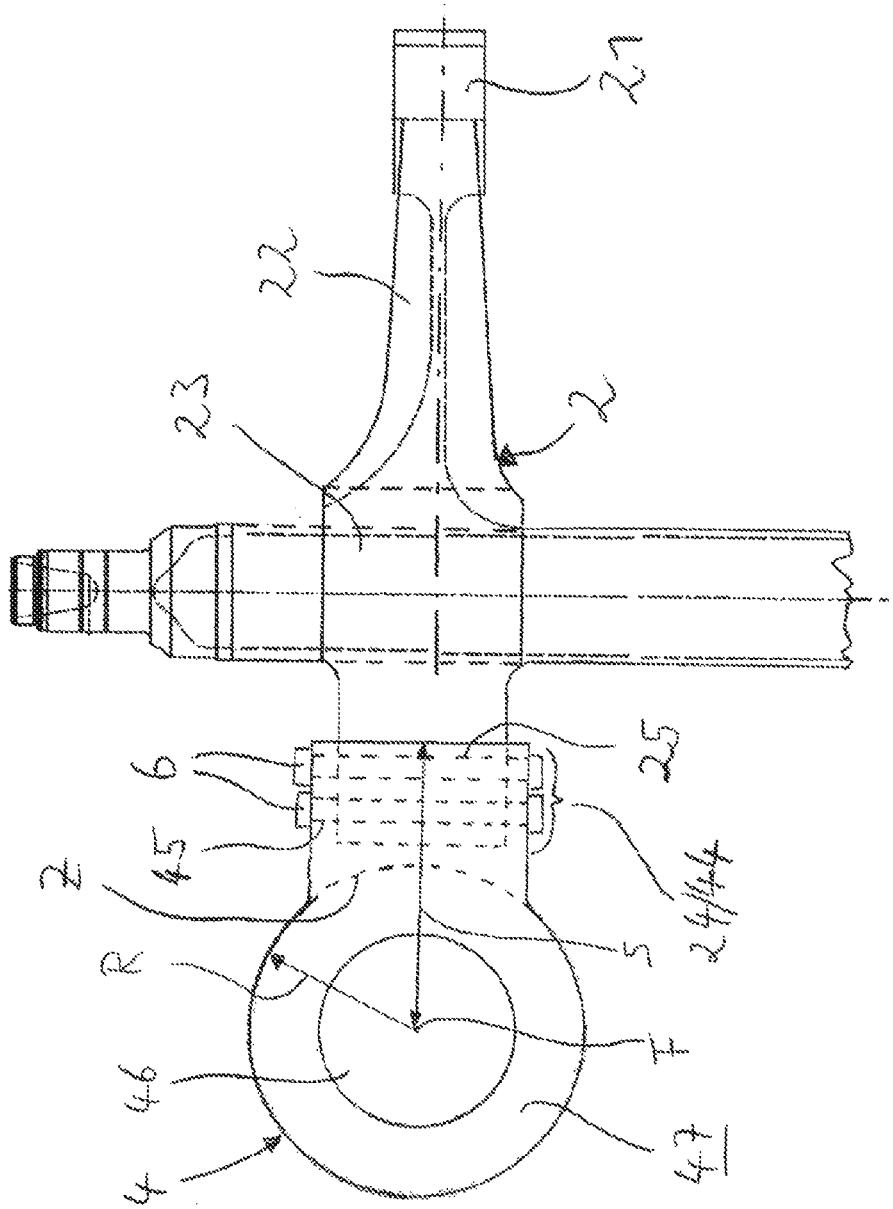
FIG. 3 shows a view of a further preferred embodiment of the steering unit of the invention.

In the top plan view of FIG. 3 of a preferred embodiment of the steering unit according to the invention, a preferred asymmetry of the steering unit, in particular of the arm 2 of the steering unit, is shown. Said asymmetry can be traced back in particular to requirements or building space conditions in the chassis region of the commercial vehicle, wherein it is possible to optimally use the building space conditions due to the asymmetric design of the arm 2 for a predetermined track gauge or track width of the commercial vehicle, i.e. distance between the two wheels lying on one rotation axis, and a predetermined fixing geometry on the vehicle frame. In the second bearing portion 23 of the arm 2, an axle tube is shown extending through the second bearing portion 23 and having an axle stub at the distal (upper) end thereof. In the preferred embodiment shown, the support element 4 is fixed to the arm 2 only by means of first and second engaging means 25, 45 formed as bores and fixing elements 6 engaging therein. The two fixing elements 6 shown correspond to the minimum number of fixing elements 6 to be used in order to achieve a sufficient strength of the connection between the support element 4 and the arm 2. At the support region 42 of the support element 4 the imaginary cylinder Z is indicated, which has a radius R and within which the rolling surface 47 of the support region 42 extends. As is shown, the support-side engagement region 44 extends outside of the imaginary cylinder Z and preferably has a maximum extension S transverse to or preferably perpendicular to the spring axis F. The relationship of the radius R to the extension S assumes preferred values of 0.5 to 0.6 in this embodiment.

Figure 4:
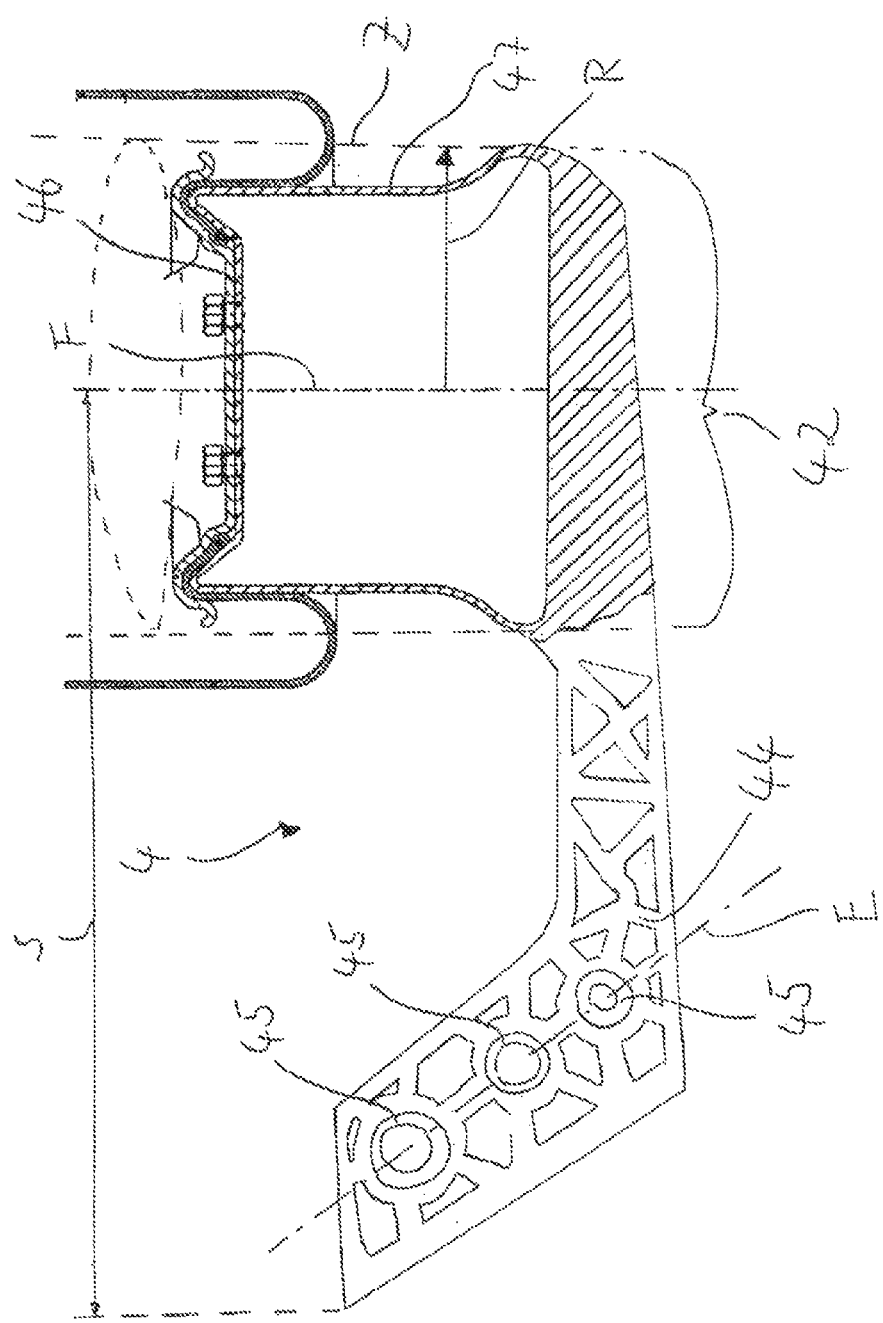
FIG. 4 shows a partially sectional side view of a preferred embodiment of the support element of the invention.

FIG. 4 shows a preferred embodiment of the support element 4, wherein an air bellows to be fixed thereto is indicated. The support portion 42 has a rolling surface 47 and a securing portion 46, wherein the rolling surface 47 is essentially rotation-symmetric about a spring axis F. An imaginary cylinder Z, the radius R of which is defined by the maximum distance between the rolling surface 47 and the spring axis F, runs concentrically about the spring axis F. Furthermore, the support element 4 in the securing portion 46 of the support region 42 has preferably a clamping plate, which is forced against the margin of the air bellows by means of screws/bolts, in order to fix the air bellows to the support element 4. The support-side engagement region 44 preferably has a lattice structure, wherein an orientation of the material webs adapted to optimize the force flow makes it possible to transmit high forces and bending moments with a relatively thin cross-sectional thickness, which advantageously makes it possible to considerably lower the weight of the support element. Preferably, in case the support element 4 and in particular the support-side engagement region 44 is made from a composite material, the second engaging means 45 are integrated as metal reinforcements or metal armor into the lattice structure so as to be able to better introduce local stress peaks and force peaks into the lattice. As is shown, advantageously metal sleeves are used. However, as a matter of course, in the embodiment shown in FIG. 1, for example, the hook-shaped second engaging means 45 may also be reinforced by metal.

Figure 5:
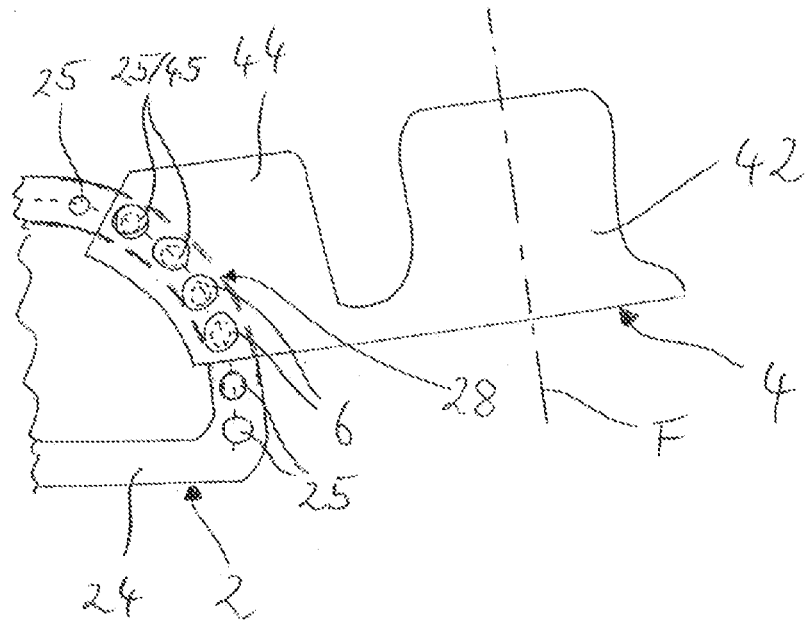
FIGS. 5-7 show detail views of preferred embodiments of the intersection between arm and support element.

FIG. 5 shows a preferred embodiment of the steering unit of the invention, wherein the arm-side engagement region 24 is arc-shaped and preferably has a plurality of first engaging means 25. The first engaging means 25 are preferably arranged at even distances along a geometry similar to a circular path shown in dashed lines in the Figure. The support-side engagement region 44 has second engaging means 45 preferably arranged along a geometry similar to the circular-path-like geometry of the arm-side support portion 24 and at the same distances as the first engaging means 25. Here, the number of the first engaging means 25 or of the second engaging means 45 is higher, wherein the support element 4 can be fixed in various mounting positions on the arm. By designing the arm-side and the support-side engagement regions 24, 44 arc-shaped or circular, it is possible to fix not only the horizontal and vertical positions of the region, where the air bellows can be fixed, i.e. of the support region 42, but simultaneously also to change the deviation or rotation of the spring axis F relative to the arm axis A. This preferred change of the deviation of the spring axis F allows for an optimum deflection process of the support region 42 into an air bellows for various vehicle types and the resulting chassis geometries. The preferred embodiment shown in the Figure allows for a total of four mounting positions of the support element 4 on the arm 2 due to the three excess first engaging means 25.

Figure 6:
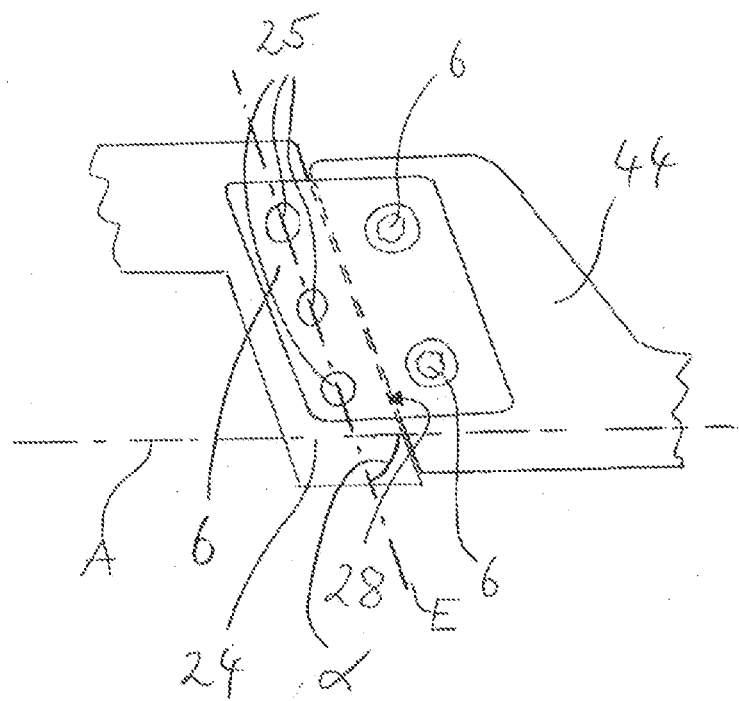

In the embodiment shown in FIG. 6, apart from two pin-shaped fixing elements 6, also a plate-shaped fixing element 6 is provided. The plate-shaped fixing element 6 preferably engages into the first engaging means 25 formed as projection or recess as well as into the pin-shaped fixing elements 6 or into the second engaging means 45 formed as projection or recess. Here, there is an indirect form fit between the first and the second engaging means 25, 45, i.e. by means of one or a plurality of fixing element(s) 6. Furthermore, the abutment surface 28 is shown, against which the support-side engagement region rests in order to be able to transmit higher bending moments and to relieve the load on the fixing elements 6 and the engaging means 25, 45. In the embodiment shown in FIG. 6, the angle α between the arm axis A and the main extension direction E preferably is in a range of 70° to 80°, wherein by moving the mounting position—when there is an excess of first or second engaging means 25, 45, as has been explained in connection with FIG. 5—the support region 42 may be set mainly in a vertical position relative to the arm 2. Thanks to this preferred embodiment, the travel height may particularly easily be adjusted.

Figure 7:
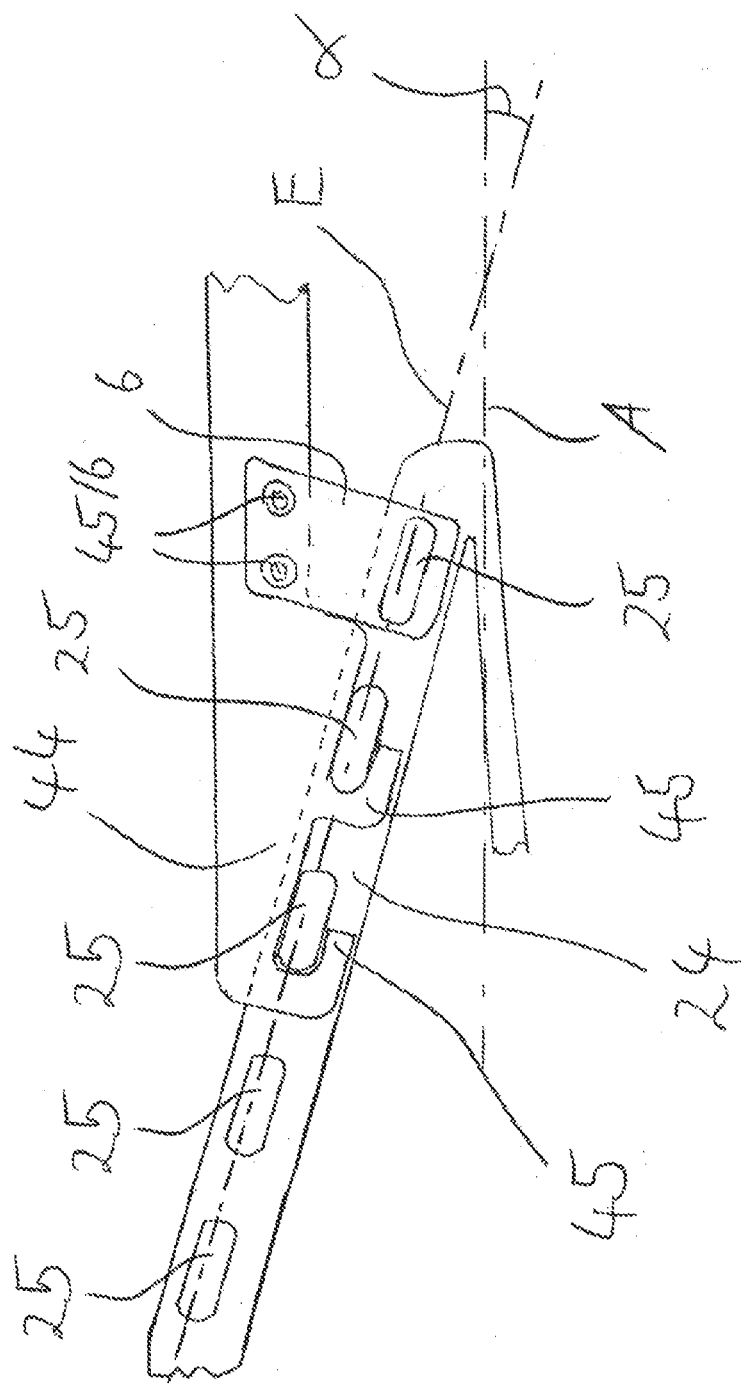

FIG. 7 shows a further preferred embodiment of the steering unit according to the invention, wherein, in contrast to the embodiment described in FIG. 6, the angle α is in a preferred range of 20° to 30°. With the help of a small angle α preferably the overall length of the steering unit is varied more than the travel height when the mounting position of the support element 4 on the arm 2 is moved. In this way, the steering unit can be adapted to a large number of vehicle types, which each expect a certain length of a trailing arm, wherein the latter can be replaced by a universally usable steering unit in the sense of the present invention. Furthermore, the design of the first and second engaging means 25, 45 is a preferred combination of the embodiments shown in FIGS. 1, 5 and 6. On the one hand, there is provided an excess of first engaging means 25 so that various mounting positions on the arm-side engagement region 24 result. Furthermore, preferably hook-shaped second engaging means 45 are used, wherein the position, in which the first engaging means 25 are held in the undercut of the second engaging means 45, is secured by means of a plate-shaped fixing element 6.

As has already been indicated by the embodiment shown in FIG. 7, it is particularly preferred within the scope of the present invention to make use of the features used individual embodiments also in further preferred embodiments. This relates for example to the design of the engaging means 25, 45, the use of fixing elements 6 or also the possibility of arranging engaging means 25, 45 not only with an offset along a line, but a plurality of engaging means 25, 45 along a plurality of line-shaped or curved geometries, which are offset relative to each other in order to further increase the flexibility of the steering unit.

LIST OF REFERENCE SIGNS

2—arm
4—support element
6—fixing element
21—first bearing portion
22—support region
23—second bearing portion
24—arm-side engagement region
25—first engaging means
28—abutment surface
42—support region
44—support-side engagement region 45—second engaging means
46—fixing portion
47—rolling surface
α—angle
E—main extension direction
F—spring axis
R—radius of the imaginary cylinder
S—extension
Z—imaginary cylinder

The invention claimed is:

1. A suspension unit for commercial vehicles, comprising:
an arm; and
a support element;
wherein the support element includes a support region and a support-side engagement region, wherein the support region and the support engagement region are a single-piece with one another;
wherein the arm includes an arm-side engagement region;
wherein a first engaging structure is located on the arm-side engagement region, the first engaging structure being engageable into or attachable to a second engaging structure located on the support-side engagement region; and
wherein the support region includes a securing portion configured to fix an air spring bellows and a rolling surface, and wherein the rolling surface is a single-piece with the support engagement region.

2. The suspension unit of claim 1, wherein the rolling surface is substantially rotation-symmetric about a spring axis, the maximum distance of the rolling surface transverse to the spring axis is the radius of a cylinder region, and wherein the support-side engagement region is arranged on the support element.

3. The suspension unit of claim 2, wherein the support-side engagement region is arranged outside of the cylindrical region.

4. The suspension unit of claim 2, wherein the support-side engagement region comprises a maximum extension transverse to the spring axis, and wherein the relationship of the radius to the extension is in a range of 0.1 to 0.95.

5. The suspension unit of claim 4, wherein the relationship of the radius to the extension is in the range of 0.3 to 0.8.

6. The suspension unit of claim 5, wherein the relationship of the radius to the extension is in the range of 0.4 to 0.6.

7. The suspension unit of claim 1, wherein the first engaging structure comprises at least one of a projection and a recess, wherein the second engaging structure comprises a geometry corresponding to the first engaging structure and can be brought into form-fitting engagement with the first engaging structure.

8. The suspension unit of claim 1, wherein a fixing element can be brought into form-fitting engagement both with the first engaging structure and with the second engaging structure.

9. The suspension unit of claim 1, wherein the first engaging structure and the second engaging structure are one of a plurality of first and second engaging structures, and wherein at least one first engaging structures and one second engaging structures comprise a bore and can engage into a fixing element.

10. The suspension unit of claim 1, wherein the arm-side engagement region includes an abutment surface against which an abutment surface of the support-side engagement region may brought into supporting abutment.

11. The suspension unit of claim 1, wherein the arm includes a first bearing portion, a support region and a second bearing portion, the support region extends between the first and the second bearing portions, an arm axis runs through the first and the second bearing portions, the arm-side engagement region includes a middle main extension direction, and wherein the middle main extension direction is at least one of pivoted and inclined relative to the arm axis by an angle.

12. The suspension unit of claim 11, wherein the angle comprises values of 1°-90°.

13. The suspension unit of claim 12, wherein the angle comprises values of 15°-75°.

14. The suspension unit of claim 13, wherein the angle comprises values of 30°-60°.

15. The suspension unit of claim 1, wherein the first engaging structure includes an engagement direction which is in a parallel surface to the first abutment surface, and wherein a plurality of first engaging structures are provided along the parallel surface on the arm-side engagement region.

16. The suspension unit of claim 1, wherein there is a larger number of first engaging structures than second engaging structures, and wherein the first engaging structures are arranged at equal distances from one another on the arm-side engagement region.

17. The suspension unit of claim 1, wherein the support element comprises a composite material, and wherein 0.2 to 1 times of the support element comprises the composite material.

18. The suspension unit of claim 17, wherein 0.5 to 1 times of the support element comprises the composite material.

19. The suspension unit of claim 18, wherein 0.75 to 0.95 times of the support element comprises the composite material.

20. The suspension unit of claim 17, wherein the composite material comprises carbon-fiber composite material.

21. The suspension unit of claim 1, wherein the support-side engagement region includes a lattice structure.

22. The suspension unit of claim 1, wherein in the securing portion of the support element a clamping plate fixes an air bellows in a force-fitting manner.

* * * * *